(12) United States Patent
Kang et al.

(10) Patent No.: US 8,677,488 B2
(45) Date of Patent: Mar. 18, 2014

(54) DISTRIBUTED DENIAL OF SERVICE ATTACK DETECTION APPARATUS AND METHOD, AND DISTRIBUTED DENIAL OF SERVICE ATTACK DETECTION AND PREVENTION APPARATUS FOR REDUCING FALSE-POSITIVE

(75) Inventors: Kyoung-Soon Kang, Daejeon-si (KR);
Hak-Suh Kim, Daejeon-si (KR);
Boo-Geum Jung, Daejeon-si (KR);
Ki-Cheol Jeon, Daejeon-si (KR);
Byung-Jun Ahn, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 62 days.

(21) Appl. No.: 13/323,050

(22) Filed: Dec. 12, 2011

(65) Prior Publication Data

US 2012/0151593 A1    Jun. 14, 2012

(30) Foreign Application Priority Data

Dec. 13, 2010    (KR) .................. 10-2010-0127006

(51) Int. Cl.
*H04L 29/06* (2006.01)
(52) U.S. Cl.
USPC .......................................................... 726/23
(58) Field of Classification Search
None
See application file for complete search history.

(56) References Cited

U.S. PATENT DOCUMENTS

2005/0111367 A1* 5/2005 Jonathan Chao et al. ..... 370/235
2011/0099622 A1* 4/2011 Lee et al. ........................ 726/13

FOREIGN PATENT DOCUMENTS

KR    10-2010-0066170    6/2010

OTHER PUBLICATIONS

Soule, Augustin et al., "Combining filtering and statistical methods for anomaly detection", Proceeding IMC '05 Proceedings of the 5th ACM SIGCOMM conference on Internet Measurement pp. 331-344, USENIX Association Berkeley, CA, USA ©, 2005.*

* cited by examiner

*Primary Examiner* — Gilberto Barron, Jr.
*Assistant Examiner* — David Le
(74) *Attorney, Agent, or Firm* — Staas & Halsey LLP (57) ABSTRACT

Provided is a DDoS attack detection apparatus including an information collecting unit to collect DDoS detection information including rate information about traffic change, variation of a first type flow and a Packet Per Second (PPS) for a second type flow, in which the rate information about traffic change is obtained using packet count of packets input per a unit time, flow count of flows input per the unit time and the byte count of bytes input per the unit time; and a testing unit to calculate a probability of occurrence of the DDoS attack by use of a first probability determined by the rate information about traffic change, a second probability determined by the variation of the first type flow and a third probability determined by the PPS for the second type flow and detect occurrence of the DDoS attack based on the probability of occurrence of the DDoS attack.

19 Claims, 6 Drawing Sheets

DISTRIBUTED DENIAL OF SERVICE ATTACK DETECTION APPARATUS AND METHOD, AND DISTRIBUTED DENIAL OF SERVICE ATTACK DETECTION AND PREVENTION APPARATUS FOR REDUCING FALSE-POSITIVE

CROSS-REFERENCE TO RELATED APPLICATION

This application claims the benefit under 35 U.S.C. §119(a) of Korean Patent Application No. 10-2010-0127006, filed on Dec. 13, 2010, the disclosure of which is incorporated by reference in its entirety for all purposes.

BACKGROUND

1. Field

The following description relates to a Distributed Denial of Service (DDoS) attack detection technology, and more particularly, to an apparatus and method for reducing false-positive when a router of an Internet Protocol (IP) network detects the DDoS attack.

2. Description of the Related Art

Distributed Denial of Service (DDoS) attack is an attempt to make a specific server unavailable to provide services by allowing multiple computers to simultaneously operate. In order to attack a specific server, a hacker deploys a tool for DDoS attack in multiple computers and generates a great amount of traffic that is hard for a target server to handle such that the target server can no longer provide its intended services.

The DDoS attack is classified into a network bandwidth attack, which consumes all of limited bandwidth to interrupt normal service, and a system resource exhaustion attack, which exhausts the CPU and the memory of a server or network equipment to hinder services.

Currently, the DDoS attack is taken on the online game providers, financial companies, government organization, etc. through various manners. Against such a DDoS attack, DDoS prevention equipment is used. The DDoS prevention is achieved by using an Access Control List (ACL), performing Drop on packets, which are determined as DDoS attack, or using exclusive security equipment. The best way to prevent the DDoS attack is to use inline process security equipment. However, the security equipment needs to have a speed exceeding the network line rate, and resources of the security equipment also need to endure the DDoS attack, thereby increasing the expense for building the security equipment.

In this regard, a router needs to mitigate the network traffic to some degree. However, according to the conventional Drop scheme, all of the traffic directed to a target server is dropped. Accordingly, it is impossible to provide services through an external network of the target server. In addition, even if the ACL is used to respond to the DDoS attack, it is difficult to respond to it with a small number of ACLs. In addition, if the ACL is used to protect the target server against several tens of thousands attack, a great amount of work load is imposed on a server administrator.

SUMMARY

The following description relate to a technology capable of reducing false-positive that normal traffic is mistaken for DDoS attack traffic when a router of an IP network detects the DDoS attack on a target system without the aid of external security equipment.

In one general aspect, there is provided a Distributed Denial of Service (DDoS) attack detection apparatus including: an information collecting unit configured to collect DDoS detection information including rate information about traffic change, variation of a first type flow and a Packet Per Second (PPS) for a second type flow, in which the rate information about traffic change is obtained using packet count of packets input per a unit time, flow count of flows input per the unit time and the byte count of bytes input per the unit time, the first type flow is defined by use of a target IP address, and the second type is defined by use of a target IP address, a source IP address and a type of protocols; and a testing unit configured to calculate a probability of occurrence of the DDoS attack by use of a first probability determined by the rate information about traffic change, a second probability determined by the variation of the first type flow and a third probability determined by the PPS for the second type flow and detect occurrence of the DDoS attack based on the probability of occurrence of the DDoS attack.

In another general aspect, there is provided a Distributed Denial of Service (DDoS) attack detection and prevention apparatus including: an information collecting unit configured to collect DDoS detection information including rate information about traffic change, variation of a first type flow and a Packet Per Second (PPS) for a second type flow, in which the rate information about traffic change is obtained using packet count of packets input per a unit time, flow count of flows input per a the unit time and byte count of bytes input per the unit time, the first type flow is defined by use of a target IP address, and the second type flow is defined by use of a target IP address, a source IP address and a type of protocols; a testing unit configured to calculate a probability of occurrence of the DDoS attack by use of a first probability that is determined by the rate information about traffic change, a second probability that is determined by the variation of the first type flow and a third probability that is determined by the PPS for the second type flow and detect occurrence of the DDoS attack based on the probability of occurrence of the DDoS attack; and a responding unit configured to perform at least one of a first operation, a second operation and a third operation based on the probability of occurrence of the DDos, in which the first operation collects log information about input packets, a second operation probabilistically drops a flow currently being input and a third operation probabilistically drops a flow having been previously input.

In another general aspect, there is provided a Distributed Denial of Service (DDoS) attack detection method including: collecting DDoS detection information including rate information about traffic change, variation of a first type flow and Packet Per Second (PPS) for a second type flow, in which the rate information about traffic change is obtained using packet count of packets input per a unit time, flow count of flows input per the unit time and byte count of bytes input per the unit time, the first type flow is defined by use of a target IP address, and the second type flow is defined by use of a target IP address, a source IP address and a type of protocols; and calculating a probability of occurrence of the DDoS attack by use of a first probability that is determined by the rate information about traffic change, a second probability that is determined by the variation of the first type flow and a third probability that is determined by the PPS for the second type flow.

Other features will become apparent to those skilled in the art from the following detailed description, which, taken in

BRIEF DESCRIPTION OF THE DRAWINGS

Elements, features, and structures are denoted by the same reference numerals throughout the drawings and the detailed description, and the size and proportions of some elements may be exaggerated in the drawings for clarity and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Figure 1:
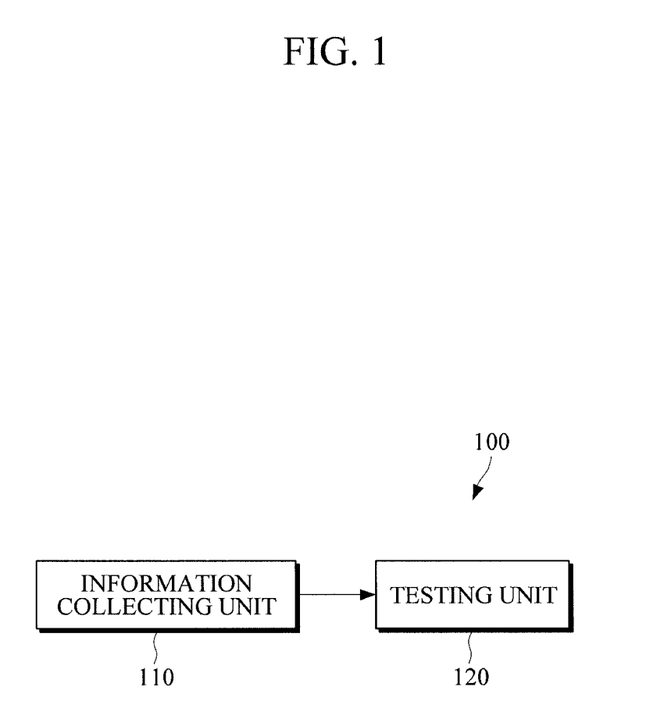
FIG. 1 illustrates the configuration of an example of a DDoS attack detection apparatus.

FIG. 1 illustrates the configuration of an example of a DDoS attack detection apparatus.

As shown in FIG. 1, a Distributed Denial of Service (DDoS) attack detection apparatus 100 may include an information collecting unit 110 and a testing unit 120. The DDoS attack detection apparatus 100 is implemented using network equipment such as a router and a network switch.

The DDos attack detection apparatus 100 is configured to detect the DDoS attack by calculating the total DDoS attack probability by using a plurality of detection schemes and adding up probabilities that are determined according to the respective detection schemes. The plurality of detection schemes may be performed in terms of interface, target and source of the DDoS attack detection apparatus 100.

Data traffic flow (hereinafter, referred to as flow) is defined as a set of a series of packets that are identified by the same combination of fields extracted from headers of the packets. In general, the flow represents a series of packets having the same source IP, target IP address, protocol type (or protocol value), source port number and target port number in an internet protocol header. According to an example, a first type flow represents a series of packets having the same target IP address, and a second type flow represents a series of packets having the same target IP address, the same source IP address and the same protocol type.

The information collecting unit 110 collects DDoS detection information for the transmitted and received packets through the DDoS attack detection apparatus 100 to perform a plurality of detection schemes. The information collecting unit 110 may collect DDoS detection information used to determine the probability of occurrence of the DDoS attack in terms of interface, for example, the information collecting unit 110 collects rate information about traffic change by use of packet count of packets input per a unit time, flow count of flows input per the unit time and byte count of bytes input per the unit time. In addition, the information collecting unit 110 may collect DDoS detection information used to determine the probability of occurrence of the DDoS attack in terms of the target, for example, the information collecting unit 110 collects the variation of the first type flow that is defined by use of a target IP address. In addition, the information collecting unit 110 may collect DDoS detection information used to determine the probability of occurrence of the DDoS attack in terms of the source, for example, the information collecting unit 110 collects Packet Per Second (PPS) for the second type flow that is defined by use of a target IP address, a source IP address and a type of protocols.

The testing unit 120 determines a first probability by the rate information about traffic change, determines a second probability by the variation of the first type flow and determines a third probability by the PPS for the second type flow. The testing unit 120 sets the first probability to be higher if the rate information about traffic change is larger, sets the second probability to be higher if the variation of the first type flow is larger, and sets the third probability to be higher if the PPS for the second type flow is larger. The testing unit 120 calculates the probability of occurrence of the DDoS attack by use of the first probability determined by the rate information about traffic change, the second probability determined by the variation of the first type flow and the third probability determined by the PPS for the second type flow and then detects occurrence of the DDoS based on the calculated probability of occurrence of the DDoS attack.

Figure 2:
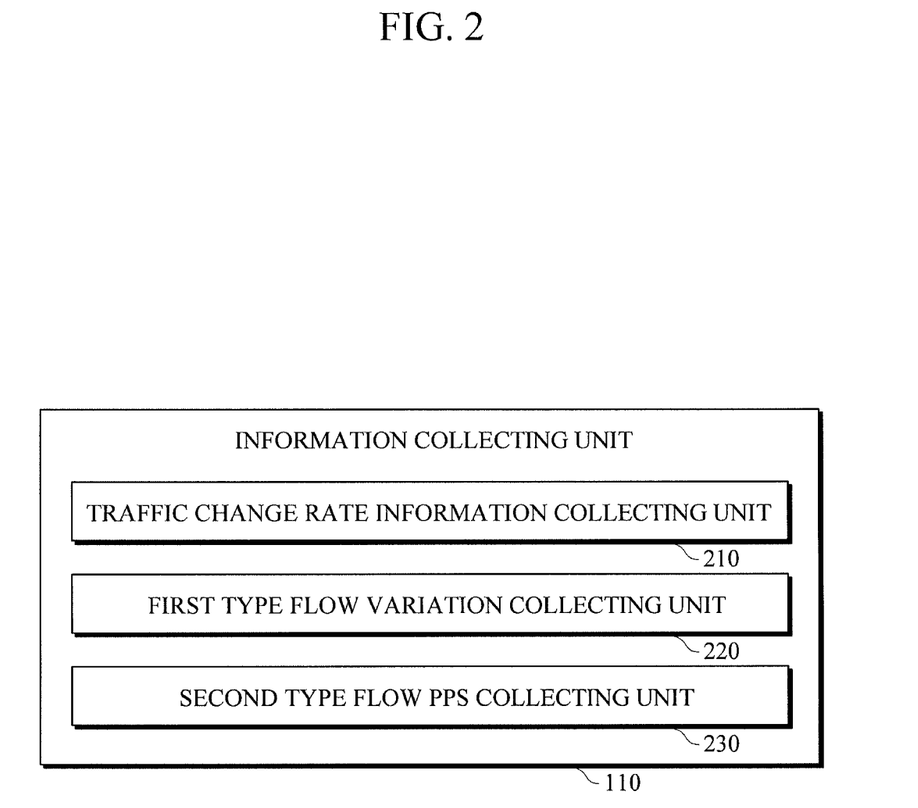
FIG. 2 illustrates the configuration of an information collecting unit of FIG. 1.

FIG. 2 illustrates the configuration of an information collecting unit of FIG. 1.

The information collecting unit 110 may include a traffic change rate information collecting unit 210, a first type flow variation collecting unit 220 and a second type flow PPS collecting unit 230.

The traffic change rate information collecting unit 210 collects information about the rate of traffic change by use packet count of packets input per a first unit time, flow count of flows input per the first unit time and byte count of bytes input per the first unit time as DDoS detection information used to determine the probability of occurrence of the DDoS attack in terms of the interface. To this end, the traffic change rate information collecting unit 210 may collect information about packet count, flow count and byte count per a unit time, for example, per 10 seconds or 20 seconds.

The traffic change rate information collecting unit 210 calculates a packet ratio (PR), a flow ratio (FR) and a byte ratio (BR) by use of the information about the packet count, flow count and byte count collected at each first unit time. The packet ratio (PR) corresponds to a ratio of a maximum (PM) of packet count of packets input per a second unit time, which is longer than the first unit time, to an average (PA) of packet count of packets input per the second unit time. The flow ratio (FR) corresponds to a ratio of a maximum (FM) of flow count of flows input per the second unit time to an average (FA) of flow count of flows input per the second unit time. The byte ratio (BR) corresponds to a ratio of a maximum (BM) of byte count of bytes input per the second unit time to an average (BA) of byte count of bytes input per the second unit time. The packet ratio (PR) represents a value obtained by dividing the PM by the PA, the flow ratio (FR) represents a value obtained by dividing the FM by the FA and the byte ratio (BR) represents a value obtained by dividing the BM by the BA. The second unit time may be 30 minutes or one hour.

The traffic change rate information collecting unit 210 determines the rate information about traffic change by use of the packet ratio (PR) relative to the flow ratio (FR) and the byte ratio (BR) relative to the flow ratio (FR). If the DDoS attack does not occur, the PR, the FR and the BR are constant.

If the PR is larger than the BR, the traffic change rate information collecting unit 210 uses a third value ((PR/FR)/(BR/FR)), which is obtained by dividing a first value (PR/FR) of the PR divided by the FR by a second value (BR/FR) of the BR divided by the FR, as the rate information about traffic change. If the PR is smaller than the BR, the traffic change rate information collecting unit 210 uses a sixth value ((BR/FR)/(PR/FR)), which is obtained by dividing a fourth value (BR/FR) of the BR divided by the FR by a fifth value (PR/FR) of the PR divided by the FR, as the rate information about traffic change.

The first type flow variation collecting unit 220 collects information about the variation of the first type flow, which is defined by use of a target IP address, as the DDoS detection information used to determine the probability of occurrence of the DDoS attack in terms of target. The first type flow variation collecting unit 220 may obtain an estimation value and a measurement value for each of Packet Per Second (PPS) of a first type flow, Byte Per Second (BPS) of a first type flow and Flow count of a first type flow. The first type flow variation collecting unit 220 calculates a ratio of a measurement value to a value of the measurement value minus an estimation value for each of the PPS of the first type flow, the BPS of the first type flow and the Flow count of the first type flow, and determines a highest ratio among the respective ratios calculated for the PPS, the BPS and the Flow count as the amount of change of the first type flow. The first type flow variation collecting unit 220 calculates the estimation value for each of the PPS, BPS and the flow count of the first type flow by use of an exponential smoothing scheme, etc.

For example, the first type flow variation collecting unit 220 may perform the estimation scheme on the flow at each unit time, for example, 10 seconds or 20 seconds.

When the exponential smoothing scheme is used, $S_t$ is an estimation value, $X_t$ is a current measurement value, and Alpha is a smoothing constant which is larger than 0 and smaller than 1.

An initial vale of the Alpha may be set to 0.3.

In the exponential smoothing scheme, an initial value ($S_0$) of the estimation is set to be identical to an initial value ($X_0$) of the measurement, that is, $S_0=X_0$. In addition, the exponential smoothing is implemented by use of an equation expressed that $S_t=Alpha*X_{t-1}+(1-Alpha)*S_{t-1}$. That is, a new estimation ($S_t$) is obtained by giving weights to a previous estimation value ($S_{t-1}$) and a previous measurement value ($X_t$), respectively, and adding up the previous estimation value given a predetermined weight and the previous measurement value given a predetermined weight.

If $S_t$ is equal to or smaller than ($0.3*X_t$), Alpha is set to be 0.3. If $S_t$ is larger than ($0.3*X_t$) and also $S_t$ is equal to or smaller than ($0.5*X_t$), Alpha is set to be 0.1. If $X_t$ is larger than ($0.5*S_t$), it is determined that DDoS attack occurs. If it is determined that DDoS attack occurs, the current measurement value ($X_t$) is set to a measurement value ($X_t$) of a previous state.

If $X_t$ is larger than $S_t$, indicating that traffic increases, the first type flow variation collecting unit 220 calculates a ratio of $X_t/(X_t-S_t)$ as the information about the variation of the first type flow. That is, the first type flow variation collecting unit 220 calculates a ratio of a measurement value to a value of the measurement value minus an estimation value for each of PPS of the first type flow, BPS of the first type flow and Flow count of the first type flow, and determines a highest ratio among the respective ratios calculated for the PPS, the BPS and the Flow count as the variation of the first type flow.

The second type flow PPS collecting unit 230 maintains the PPS for each target IP address and each protocol of source IP address and determines DDoS based on information about the PPS. To this end, the second type flow PPS collecting unit 230 collects DDoS detection information including PPS of the second type flow, which is defined according to source IP addresses for each target IP address and according to the type of protocols, as DDoS detection information used to determine the probability of occurrence of DDoS attack in term of source. The target IP address represents an IP address of a system aimed by attack.

The second type flow PPS collecting unit 230 calculates the PPS for the second type flow by classifying the flow according to source IP addresses for each target IP address and according to the type of protocols for each of the source IP addresses through analysis on a header of each input packet, counting the classified flows and using the flow count of the classified flows. If the second type flow is classified into a plurality groups and a plurality of PPSs is calculated for each of the plurality of flows, an average of the PPSs may be used as second type flow PPS.

Figure 3:
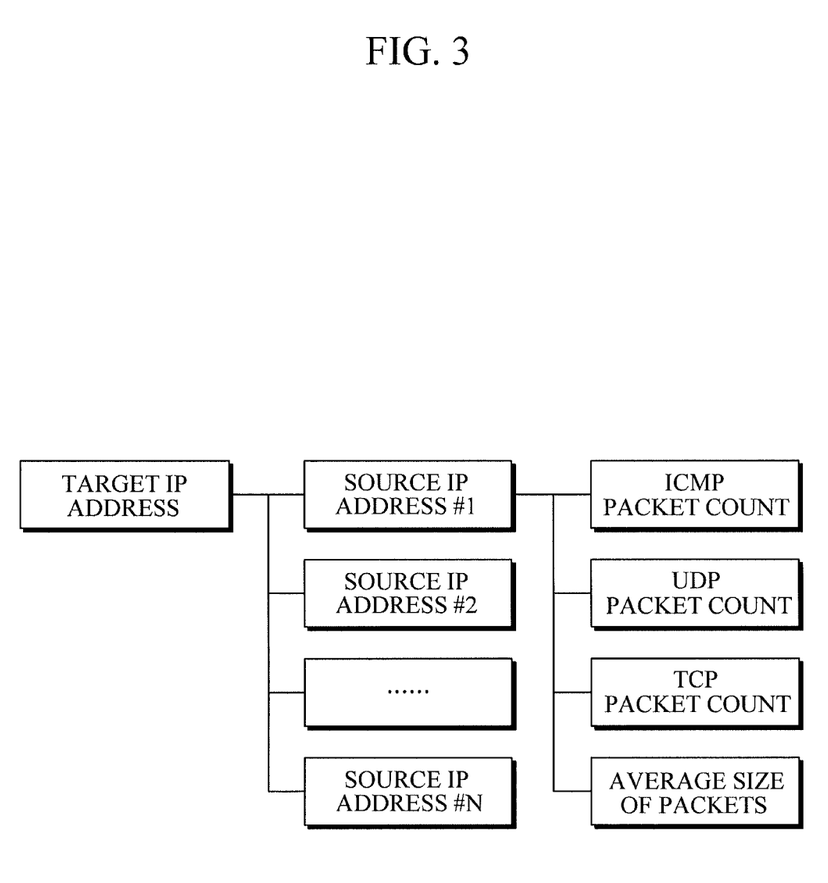
FIG. 3 illustrates the configuration of second type flow information about second type flow that is collected by a second type flow PPS collecting unit of FIG. 2.

FIG. 3 illustrates the configuration of second type flow information about second type flow that is collected by a second type flow PPS collecting unit of FIG. 2.

The second type flow information includes information about packet count of a flow that is defined according to a target IP address, source IP addresses of packets orienting to the corresponding target IP address and each protocol type. That is, information about flow serving as the DDoS detection information may be collected according to source IP addresses for a single target IP address and according to the type of protocols for each of the source IP address. In general, the protocols may include Internet Control and Message Protocol (ICMP), User Datagram Protocol (UDP) and Transmission Control Protocol (TCP). For example, packet count of a flow having a target IP address, a source IP address #1 and a protocol type of ICMP, packet count of a flow having a target IP address, a source IP address #2 and a protocol type of UDP, and packet count of a flow having a target IP address, a source IP address #3 and a protocol type of TCP may be collected.

In addition, information about average size of packets for each flow may be collected. In particular, the second type flow PPS collecting unit 230 may collect information about average size of packets for TCP type flow. The information about average size of packets for TCP type flow may be used to determine about the DDoS attack.

Figure 4:
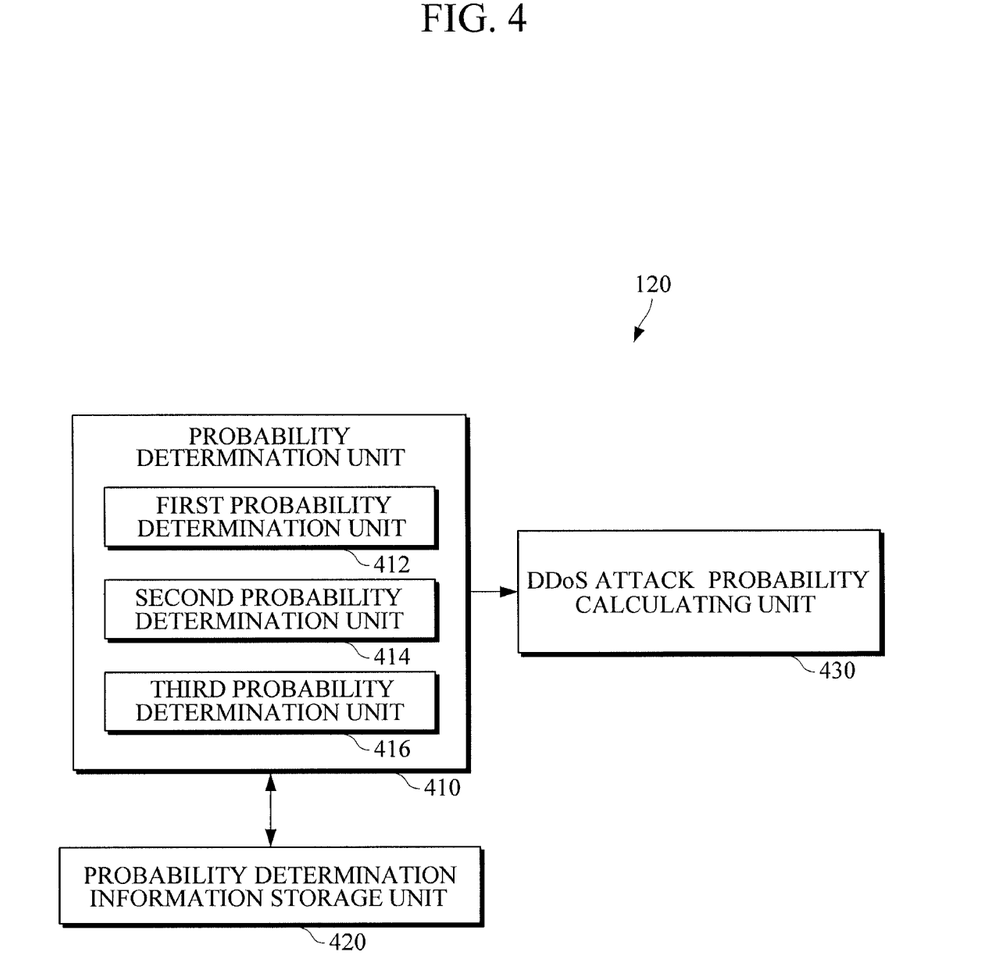
FIG. 4 illustrates the configuration of a testing unit of FIG. 1.

FIG. 4 shows the configuration of a testing unit of FIG. 1.

The testing unit 120 includes a probability determination unit 410, a probability determination information storage unit 420 and a DDoS attack probability calculating unit 430.

The probability determination unit 410 includes a first probability determination unit 412, a second probability determination unit 414 and a third probability determination unit 416.

The first probability determination unit 412 determines a first probability according to the rate information about traffic change. The first probability determination unit 412 may set the first probability to be higher if the rate information about traffic change is larger. For example, the first probability determination unit 412 may set the first probability to be 50% if the rate information (PFBR) about traffic change is equal to or larger than 2, set the first probability to be 70% if the rate information (PFBR) about traffic change is equal to or larger than 5, and set the first probability to be 90% if the rate information (PFBR) about traffic change is equal to or larger than 8.

The second probability determination unit 414 determines the second probability according to the variation of the first type flow. The second probability determining unit 414 may set the second probability to be higher if the variation of the first type flow is larger. For example, the second probability determination unit 414 determines the second probability to be 50% if the variation of the first type flow is equal to or larger than 2, determines the second probability to be 70% if the variation of the first type flow is equal to or larger than 4, determines the second probability to be 90% if the variation of the first type flow is equal to or larger than 8.

The third probability determination unit 416 determines the third probability according to the PPS for the second type flow. The third probability determination unit 416 may set the third probability to be higher if the PPS for the second type flow is larger.

For example, in the case of a ICMP protocol type flow, the third probability determination unit 416 may determine the third probability to be 10% if the PPS is equal to or larger than 10, determines the third probability to be 20% if the PPS is equal to or larger than 20 and smaller than 30, determines the third probability to be 40% if the PPS is equal to or larger than 30 and smaller than 40, determines the third probability to be 60% if the PPS is equal to or larger than 40 and smaller than 50 and determines the third probability to be 90% if the PPS is equal to or larger than 50.

Similar to the case of the ICMP protocol type flow, the third probability determination unit 413 may determine the third probability for a UDP protocol type flow. However, the third probability determination unit 413 may determine the third probability for a UDP protocol type flow to be higher than the third probability for an ICMP protocol type flow when the UDP protocol type flow has the same PPS as the ICMP protocol type flow.

When the third probability determination unit 416 determines the third probability according to the PPS of a TCP protocol type flow, the third probability determination unit 416 may determine the third probability of the TCP protocol type flow to be higher than each of the third probabilities of ICMP protocol type flow and UDP protocol type flow by calculating the average size of packets corresponding to the TCP protocol type flow and determining the third probability by use of the calculated average size.

The third probability determination unit 416 may determine the third probability according to the PPS of the TCP protocol type flow by additionally considering the average size of packets. For example, the third probability determination unit 416 determines the third probability to be 30% if the PPS is equal to or larger than 10 and smaller than 20 and the average size of packets is equal to or smaller than 200 Byte, determines the third probability to be 50% if the PPS is equal to or larger than 20 and smaller than 30 and the average size of packets is equal to or smaller than 200 Byte and determines the third probability to be 70% if the PPS is equal to or larger than 30 and the average size of packets is equal to or smaller than 200 Byte.

In addition, with respect to the same level of PPS for the TCP protocol type flow, the third probability determination unit 416 may set the third probability to be higher if the average size of packets is smaller than 200 Byte, for example, 100 Byte or smaller. For example, when the average size of packets is equal to or smaller than 100 Byte, the third probability determination unit 416 determines the third probability to be 40% if the PPS of the TCP protocol type flow is equal to or larger than 10 and smaller than 20, and determines the third probability to be 60% if the PPS of the TCP protocol type flow is larger than 20. As described above, in the case of the second type flow of TCP type, the third probability determination unit 416 may determine the third probability in inverse proportion to the Byte size of packets.

The DDoS detection method may be implemented using various schemes in addition to the above described scheme, and achieved by use of a probability obtained through the corresponding schemes. A criteria value of the rate information about traffic change used to determine the first probability may be adjusted by an administrator. For example, in the case that the first probability is determined to be 50% when the rate information about traffic change is equal to or larger than 10 and smaller than 20, the values of 10 and 20 serving as the criteria values may be adjusted by an administrator. Similarly, a criteria value of the variation of the first type flow used to define the second probability and a criteria value of the PPS of the second type flow used to determine the third probability may be adjusted by an administer.

The probability determination storage unit 420 may store a probability determination scheme and a probability determination policy information that are used to determine the first probability according to the rate of traffic change, determine the second probability according to the variation of the first type flow and determine the third probability according to the PPS of the second type flow.

The DDoS attack probability calculation unit 430 gives weights to the first probability, the second probability and the third probability that are obtained each DDoS detection scheme. The sum of the weights is equal to 1.

For example, a weight of 0.3, a weigh of 0.4 and a weight of 0.3 are given to the first probability, the second probability and the third probability, respectively. In this case, the probability (P) of occurrence of DDoS attack is calculated as shown in an equation that P=(The first probability*0.3)+(The second probability*0.4)+(The third probability*0.3).

Figure 5:
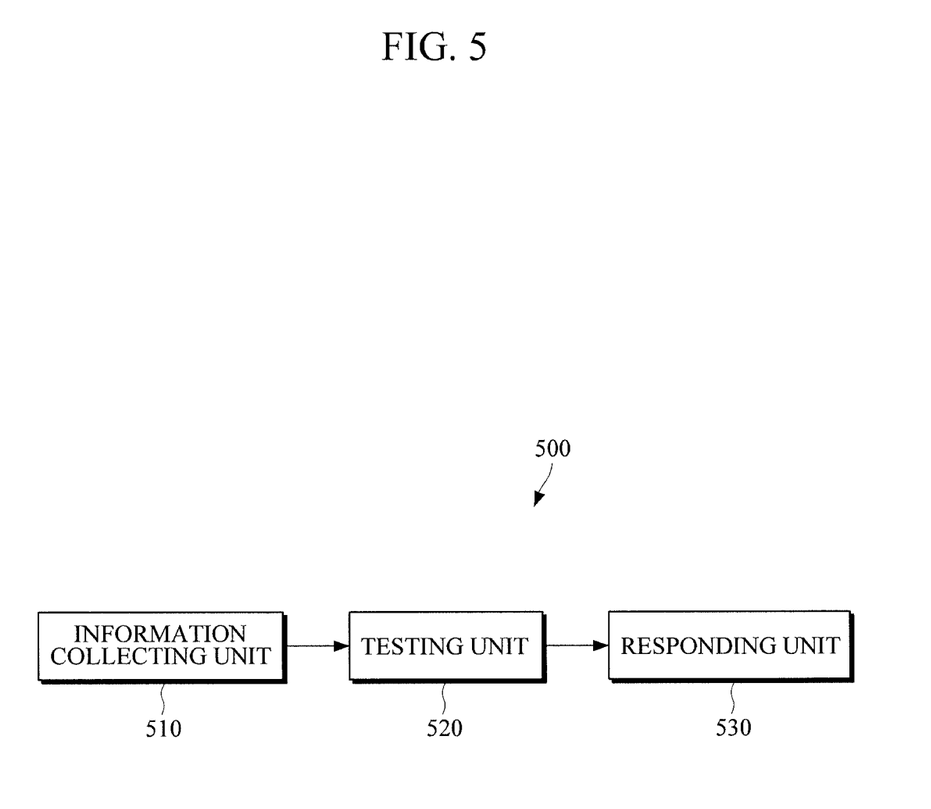
FIG. 5 illustrates the configuration of an example of a DDoS attack detection and prevention apparatus.

FIG. 5 shows the configuration of an example of a DDoS attack detection and prevention apparatus.

A DDoS attack detection and prevention apparatus 500 may include an information collecting unit 510, a testing unit 520 and a responding unit 530. The information collecting unit 510 and the testing unit 520 have the same configurations as the information collecting unit 110 and the testing unit 120 described with respect to FIG. 1, and detailed descriptions thereof will be omitted. The responding unit 530 is configured to determine a countermeasure by use of the probability of occurrence of DDoS attack that is calculated by the DDoS attack probability calculating unit 430 of FIG. 4, and performs a packet processing according to the determined countermeasure. For example, the responding unit 530 determines that a DDoS attack occurs if the probability (P) of occurrence of DDoS attack is higher than 50%. The responding unit 530 responds to the DDoS attack in various countermeasures according to the probability (P) of occurrence of DDoS attack. In addition, the responding unit 530 may use a stepwise countermeasure according to the probability (P) of occurrence of DDoS attack.

The responding unit 530 performs at least one of a first operation, a second operation and a third operation. The first operation collects log information about input packets, the second operation probabilistically drops a flow currently being input. The third operation probabilistically drops a flow having been previously input. According to the second operation and the third operation, packets are probabilistically dropped. The second operation is performed on the flow currently being input to the DDoS detection and prevention apparatus 500. The third operation is performed on a flow that has been previously input and is supposed to be input again a predetermined time after the corresponding flow has been finished, for example, N seconds after the corresponding flow has been finished. If the PPS of a flow falls within a first range, the responding unit 530 performs the first operation. If the PPS of a flow falls within a second range larger than the first range, the responding unit 530 performs the second operation and the third operation.

The responding unit 530 determines a countermeasure according to the probability of occurrence of DDoS attack that is calculated by use of the first probability, the second probability and the third probability. In addition, the responding unit 530 responds to the DDoS attack by performing a control on individual flows by use of the first probability, the second probability, the third probability, the rate of traffic change used to determine the first probability, the variation of the first type flow used to determine the second probability and the PPS of the second type flow used to determine the third probability. For example, the responding unit 530 uses the first probability that is calculated for each flow in a line card of a router and uses the first probability as statistics information for each interface. The responding unit 530 is set to perform drop on source IP addresses that are modulated through a Reverse Path Check scheme with respect to an interface determined to be taken by DDoS occurrence attack. Accordingly, an attack using a massive IP modulation is prevented.

In addition, if it is determined that a DDoS attack occurs, the responding unit 530 controls the information collecting unit 510 to collect information accompanied by the DDoS attack during the DDoS attack. For example, in the case of the DDoS attack, the information collecting unit 510 regards the maximum of packet count, flow count, and byte count, which are used to calculate the rate information about traffic change, as abnormal values, and do not collect the maximum of packet count, flow count, and byte count.

Figure 6:
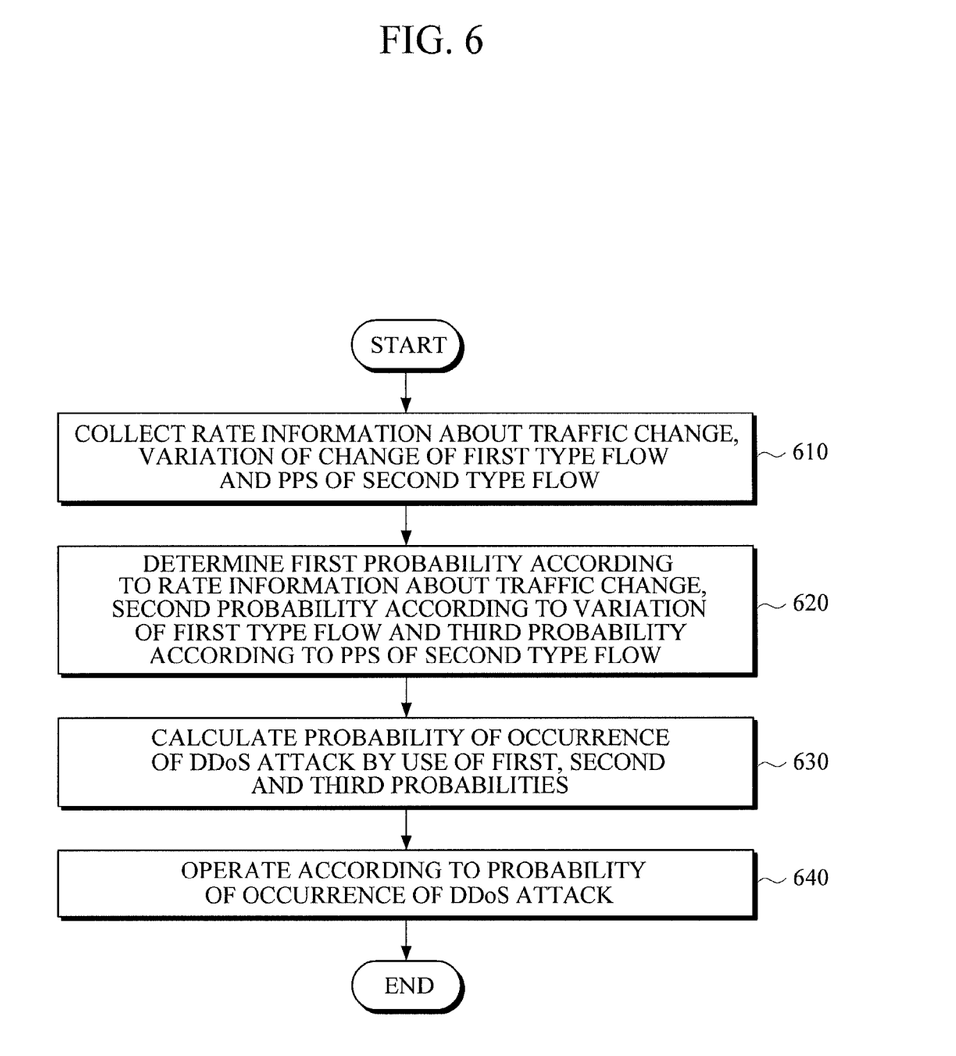
FIG. 6 illustrates the control flow of an example of a DDoS attack detection method.

FIG. 6 illustrates the control flow of an example of a DDoS attack detection method.

DDos detection information is collected (610). The DDoS detection information includes rate information about traffic change using packet count of packets input per a unit time, flow count of flows input per the unit time and byte count of bytes input per the unit time, the variation of a first type flow that is defined by use of a target IP address, and a Packet Per Second (PPS) for a second type flow that is defined by use of a target IP address, a source IP address and a type of protocols.

A first probability is determined by the rate information about traffic change, a second probability is determined by the variation of the first type flow and a third probability is determined by the PPS for the second type flow (620).

The probability of occurrence of DDoS attack is calculated by use of the first probability that is determined by the rate information about traffic change, the second probability that is determined by the variation of the first type flow and the third probability that is determined by the PPS for the second type flow (630).

It is determined whether the DDoS attack occurs according to the probability of occurrence of DDoS attack and an operation, such as DDoS attack mitigation, is performed according to the probability of occurrence of DDoS attack (640).

According to this example, the DDoS attack is detected by collectively using information about traffic change, information at a layer-2 and information at a layer-3 based on the characteristics of a router. Accordingly, this example can delicately detect DDoS attack in cooperation with security equipment, thereby reducing the false positive of the DDoS detection. In addition, since the detection result is expressed as a probability of DDoS attack, the DDoS attack can be probabilistically prevented, thereby improving the efficiency of prevention against the DDoS attack. Accordingly, the DDoS prevention can be achieved even using a lower grade security equipment.

The disclosure can also be embodied as computer readable codes on a computer readable recording medium. The computer readable recording medium is any data storage device that can store data which can be thereafter read by a computer system.

Examples of the computer readable recording medium include read-only memory (ROM), random-access memory (RAM), CD-ROMs, magnetic tapes, floppy disks, optical data storage devices, and carrier waves such as data transmission through the Internet. The computer readable recording medium can also be distributed over network coupled computer systems so that the computer readable code is stored and executed in a distributed fashion.

Also, functional programs, codes, and code segments for accomplishing the present invention can be easily construed by programmers skilled in the art to which the present invention pertains. A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A Distributed Denial of Service (DDoS) attack detection apparatus comprising:
   an information collecting unit configured to collect DDoS detection information including rate information about traffic change, variation of a first type flow and a Packet Per Second (PPS) for a second type flow, in which the rate information about traffic change is obtained using packet count of packets input per a unit time, flow count of flows input per the unit time and the byte count of bytes input per the unit time, the first type flow is defined by use of a target IP address, and the second type is defined by use of a target IP address, a source IP address and a type of protocols; and
   a testing unit configured to calculate a probability of occurrence of the DDoS attack by use of a first probability determined by the rate information about traffic change, a second probability determined by the variation of the first type flow and a third probability determined by the PPS for the second type flow and detect occurrence of the DDoS attack based on the probability of occurrence of the DDoS attack.

2. The DDoS attack detection apparatus of claim 1, wherein the testing unit sets the first probability to be higher if the rate information about traffic change is larger, sets the second probability to be higher if the variation of the first type flow is larger, and sets the third probability to be higher if the PPS for the second type flow is larger.

3. The DDoS attack detection apparatus of claim 1, wherein the information collecting unit calculates a packet ratio (PR) corresponding to a ratio of a maximum (PM) of packet count of packets input per a unit time to an average (PA) of packet count of packets input per the unit time, a flow ratio (FR) corresponding to a ratio of a maximum (FM) of flow count of flows input per the unit time to an average (FA) of flow count of flows input per the unit time and a byte ratio (BR) corresponding to a ratio of a maximum (BM) of byte count of bytes input per the unit time to an average (BA) of byte count of bytes input per the unit time, and determines the rate information about traffic change by use of the packet ratio (PR) relative to the flow ratio (FR) and the byte ratio (BR) relative to the flow ratio (FR).

4. The DDoS attack detection apparatus of claim 3, wherein if the PR is larger than the BR, the information collecting unit uses a third value ((PR/FR)/(BR/FR)), which is obtained by dividing a first value corresponding to the PR divided by the FR by a second value corresponding to the BR divided by the FR, as the rate information about traffic change, and if the PR is smaller than the BR, uses a sixth value ((BR/FR)/(PR/FR)), which is obtained by dividing a fourth value corresponding to the BR divided by the FR by a fifth value corresponding to the PR divided by the FR, as the rate information about traffic change.

5. The DDoS attack detection apparatus of claim 1, wherein the information collecting unit calculates a ratio of a measurement value to a value of the measurement value minus an estimation value for each of Packet Per Second (PPS) of the first type flow, Byte Per Second (BPS) of the first type flow and flow count of the first type flow, and determines a highest ratio among the respective ratios calculated for the PPS, the BPS and the flow count as the variation of the first type flow.

6. The DDoS attack detection apparatus of claim 5, wherein the information collecting unit calculates the estimation value for each of the PPS, BPS and the flow count by use of an exponential smoothing.

7. The DDoS attack detection apparatus of claim 1, wherein the information collecting unit calculates the PPS for the second type flow by classifying the second type flow according to source IP addresses for each target IP address and according to the type of protocols for each of the source IP addresses by analyzing a header of each input packet, counting packets belonging to the second type flow and using the packet count.

8. The DDoS attack detection apparatus of claim 7, wherein the information collecting unit further collects average size information for packets that are classified as a Transmission Control Protocol (TCP) type flow in the second type flow.

9. The DDoS attack detection apparatus of claim 7, wherein the testing unit sets the third probability to be higher in the order of a second type flow of Transmission Control Protocol (TCP), a second type flow of User Datagram Protocol (UDP) and a second type flow of Internet Control Message Protocol (ICMP) when the second type flow of TCP, the second type flow of UDP and the second type flow of ICMP have the same PPS.

10. The DDoS attack detection apparatus of claim 1, wherein the testing unit gives weights to the first probability, the second probability and the third probability, respectively, and adds up the first probability, the second probability and the third probability that are given the weights, thereby a final DDoS probability that the DDoS attack occurs.

11. A Distributed Denial of Service (DDoS) attack detection and prevention apparatus comprising:
an information collecting unit configured to collect DDoS detection information including rate information about traffic change, variation of a first type flow and a Packet Per Second (PPS) for a second type flow, in which the rate information about traffic change is obtained using packet count of packets input per a unit time, flow count of flows input per the unit time and byte count of bytes input per the unit time, the first type flow is defined by use of a target IP address, and the second type flow is defined by use of a target IP address, a source IP address and a type of protocols;

a testing unit configured to calculate a probability of occurrence of the DDoS attack by use of a first probability that is determined by the rate information about traffic change, a second probability that is determined by the variation of the first type flow and a third probability that is determined by the PPS for the second type flow and detect occurrence of the DDoS attack based on the probability of occurrence of the DDoS attack; and a responding unit configured to perform at least one of a first operation, a second operation and a third operation based on the probability of occurrence of the DDos, in which the first operation collects log information about input packets, a second operation probabilistically drops a flow currently being input and a third operation probabilistically drops a flow having been previously input.

12. The DDoS attack detection and prevention apparatus of claim 11, wherein if the probability of occurrence of the DDoS attack falls within a first range, the responding unit performs the first operation, and if the probability of occurrence of the DDoS attack falls within a second range larger than the first range, the responding unit performs the second operation and the third operation.

13. A Distributed Denial of Service (DDoS) attack detection method comprising:
collecting DDoS detection information including rate information about traffic change, variation of a first type flow and Packet Per Second (PPS) for a second type flow, in which the rate information about traffic change is obtained using packet count of packets input per a unit time, flow count of flows input per the unit time and byte count of bytes input per the unit time, the first type flow is defined by use of a target IP address, and the second type flow is defined by use of a target IP address, a source IP address and a type of protocols; and calculating a probability of occurrence of the DDoS attack by use of a first probability that is determined by the rate information about traffic change, a second probability that is determined by the variation of the first type flow and a third probability that is determined by the PPS for the second type flow.

14. The DDoS attack detection method of claim 13, wherein further comprising setting the first probability to be higher if the rate information about traffic change is larger, setting the second probability to be higher if the variation of the first type flow is larger, and setting the third probability to be higher if the PPS for the second type flow is larger.

15. The DDos attack detection method of claim 13, wherein the collecting of the information further comprises calculating the rate of traffic change, and
the calculating of the rate of traffic change comprises:
calculating a packet ratio (PR) corresponding to a ratio of a maximum (PM) of packet count of packets input per a unit time to an average (PA) of packet count of packets input per the unit time, a flow ratio (FR) corresponding to a ratio of a maximum (FM) of flow count of flows input per the unit time to an average (FA) of flow counts of flows input per the unit time and a byte ratio (BR) corresponding to a ratio of a maximum (BM) of byte count of bytes input per the unit time to an average (BA) of byte count of bytes input per the unit time; and
determining the rate information about traffic change by use of the packet ratio (PR) relative to the flow ratio (FR) and the byte ratio (BR) relative to the flow ratio (FR).

16. The DDos attack detection method of claim 15, wherein the calculating of the rate of traffic change further comprises:

using a third value ((PR/FR)/(BR/FR)), which is obtained by dividing a first value corresponding to the PR divided by the FR by a second value corresponding to the BR divided by the FR, as the rate information about traffic change, if the PR is larger than the BR, and uses a sixth value ((BR/FR)/(PR/FR)), which is obtained by dividing a fourth value corresponding to the BR divided by the FR by a fifth value corresponding to the PR divided by the FR, as the rate information about traffic change, if the PR is smaller than the BR.

17. The DDoS attack detection method of claim 13, further comprising calculating the amount of change of the first type flow, wherein the calculating of the amount of change of the first type flow comprises:

calculating a ratio of a measurement value to a value of the measurement value minus an estimation value for each of Packet Per Second (PPS) of the first type flow, Byte Per Second (BPS) of the first type flow and flow count of the first type flow; and determining a highest ratio among the respective ratios calculated for the PPS, the BPS and the flow count as the variation of the first type flow.

18. The DDoS attack detection method of claim 13, further comprising calculating the PPS for the second type flow, wherein the calculating of the PPS for the second type flow comprises:

classifying the second type flow according to source IP addresses for each target IP address and according to the type of protocols for each of the source IP addresses by analyzing a header of each input packet;

counting packets belonging to the second type flow; and using the packet count to calculate the PPS for the second type flow.

19. The DDoS attack detection method of claim 13, further comprising performing at least one of a first operation, a second operation and a third operation, in which the first operation collects log information about input packets, a second operation probabilistically drops a flow currently being input and a third operation probabilistically drops a flow having been previously input based on the probability of occurrence of the DDos.

* * * * *